J. SCHMUCK.
PACKAGE FOR LIGHT SENSITIVE FILMS.
APPLICATION FILED NOV. 13, 1912.
1,098,844.
Patented June 2, 1914.
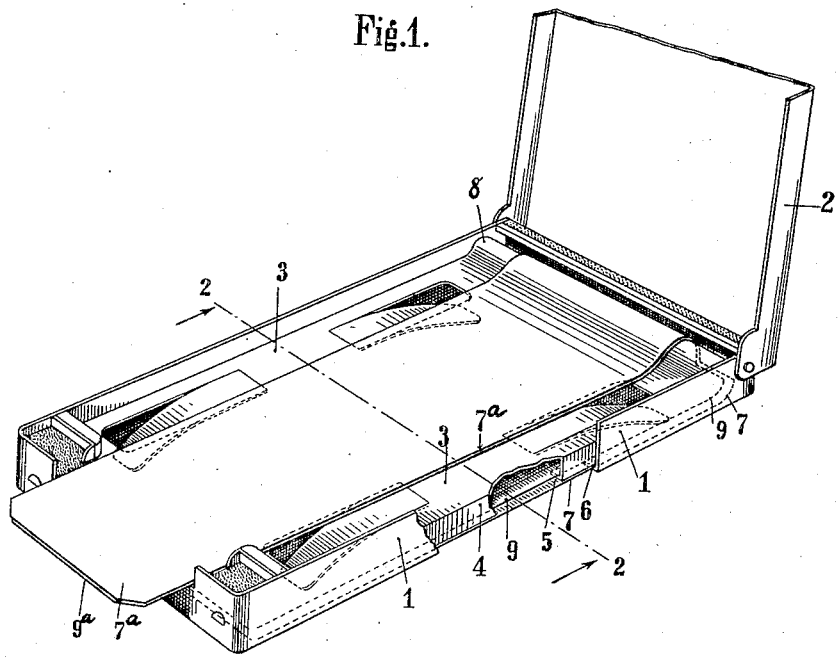
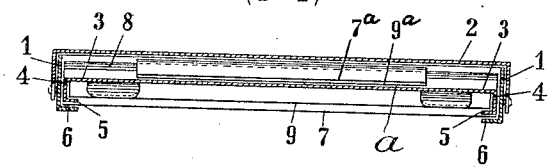

UNITED STATES PATENT OFFICE.

JOSEPH SCHMUCK, OF STEGLITZ, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

PACKAGE FOR LIGHT-SENSITIVE FILMS.

1,098,844.      Specification of Letters Patent.      Patented June 2, 1914.

Application filed November 13, 1912. Serial No. 731,058.

*To all whom it may concern:*

Be it known that I, JOSEPH SCHMUCK, a citizen of the German Empire, and resident of Steglitz, near Berlin, Germany, have invented certain new and useful Improvements in and Relating to Packages for Light-Sensitive Films, of which the following is a specification.

My invention relates to packages for light-sensitive films and has for its object the provision of means to avoid damaging of the sensitive films by entrance of light during handling of the package in daylight.

The invention is illustrated on the accompanying drawing.

Figure 1 is a perspective view of a magazine film holder in accordance with the invention and Fig. 2 is a cross-section on line 2—2 of Fig. 1.

The magazine film holder comprises two receptacles namely an outer one designated by the numeral 1 and provided with a cover 2 shown in open position and an inner receptacle having a bottom plate 3, two lateral walls 4 provided with flanges 5. The flanges 5 are turned toward the hollow space of the inner receptacle. The lateral walls of the outer receptacle 1 are likewise provided with flanges 6 turned toward the hollow space of the outer receptacle so that grooves between the flanges 5 and 6 of the two receptacles are formed. The flanges 5 and 6 of the side walls of the receptacles form the limiting members of the exposing opening of the magazine.

7 is a light-tight cover for preventing access of light to the films contained within the inner receptacle of the magazine. The light-tight protecting cover 7 is shown as provided with a pulling strip extending outside the magazine and designated 7ª. The bottom wall 3 of the inner receptacle has its one end curved so as to form a roller like guiding member 8 for the said protecting sheet 7. The films inserted into the inner receptacle are likewise provided with pulling strips extending outside the film magazine. Only one film 9 is indicated on the drawing the pulling strip of which is designated with the numeral 9ª. The roller like guiding member 8 forms at the same time a guide for the films as clearly shown in the drawing.

The handling of the film magazine is as follows: In order to fill the magazine with films the cover 2 is opened and the inner receptacle taken out. Hereafter a pile of sensitive films provided with pulling strips is inserted into the hollow space of the inner receptacle and the pulling strips are turned over the curved guiding member 8, so that they are adjacent the outer side of the bottom of the receptacle. Hereafter the protecting sheet 7 is put on the outside of the lateral flanges 5 of the inner receptacle and its pulling strip likewise turned over the curved guiding member 8. This being done the inner receptacle with the films and the protecting sheet 7 is put into the outer receptacle so that the sheet 7 with its edges is resting on the flanges 6 of the outer receptacle. Finally the cover 2 is closed allowing the pulling strips of the films and of the protecting sheet 7 to light-tightly pass from the interior of the outer receptacle to outside same. The package which forms an article of commerce is thus completed. In order to bring the films contained therein to exposure position the package may be inserted in a well known manner into the exposing chamber of a photographic camera where before the first exposure the protecting sheet 7 is drawn over the guiding member 8 by grasping its pulling strip. Hereafter the first film is ready for exposition and after exposure may be removed from inside the inner receptacle to outside by grasping its pulling strip.

It is essential in the novel construction that the protecting sheet is held with its edges within the grooves formed between flanges 5 and 6 of the two receptacles inserted the one within the other. If the protecting sheet 7 is put into the inner receptacle together with the pile of films light may get access to the sensitive coating of the films during handling of the package. This drawback is avoided by providing a special guide-way for the lateral edges of the protecting sheet 7 between the flanges 5 and 6.

What I claim is:—

1. A magazine film holder comprising an outer receptacle provided on one flat side with lateral flanges surrounding an exposing opening and on the other flat side with a cover adapted to be opened or closed and a removable inner receptacle having likewise an exposing opening substantially in alinement with the exposing opening of said outer receptacle the inner receptacle provided at its open top side with lateral flanges turned toward the hollow space of the receptacle and in such position with relation to said lateral flanges of the outer receptacle that a groove between said two sets of flanges is formed adapted for use as a guide-way for a light-tight sheet forming a cover for the exposing opening of the film magazine.

2. A magazine film holder comprising an outer receptacle provided on one flat side with lateral flanges surrounding an exposing opening and on the other flat side with a cover adapted to be opened or closed and a removable inner receptacle having likewise an exposing opening substantially in alinement with the exposing opening of said outer receptacle the inner receptacle provided at its open top side with lateral flanges turned toward the hollow space of the receptacle and in such position with relation to said lateral flanges of the outer receptacle that a groove between said two sets of flanges is formed adapted for use as a guide-way for a light-tight sheet forming a cover for the exposing opening of the film magazine one end of the bottom plate of said inner receptacle forming a curved roller like edge.

3. A film package comprising an outer receptacle, an inner receptacle both provided with exposing openings substantially in alinement with each other a pile of films inserted into the inner receptacle and provided with pulling strips located outside said inner receptacle on that side of its bottom opposite the side adjacent the films and light-tightly guided from inside the outer receptacle to outside, the side walls of said outer and inner receptacles being provided with lateral flanges turned toward their inner spaces and forming grooves between their surfaces turned toward each other and a light-tight protecting sheet closing said exposing openings of said receptacles and inserted with its lateral edges into the said grooves between said flanges of the side walls of said two receptacles.

In testimony whereof I have signed this specification in the presence of two subscribing witnesses.

JOSEPH SCHMUCK.

Witnesses:
HENRY HASPER,
WOLDEMAR HAUPT.

---

Copies of this patent may be obtained for five cents each, by addressing the "Commissioner of Patents. Washington, D. C."